United States Patent

Gracia

[15] 3,685,584
[45] Aug. 22, 1972

[54] ARRANGEMENT FOR FORMING A WATER SHIELD TO EXTINGUISH FIRES IN WATER COVERED AREAS

[72] Inventor: Eberto Gracia, 10718 Sagedowne Lane, Houston, Tex. 77034

[22] Filed: May 12, 1971

[21] Appl. No.: 142,478

[52] U.S. Cl. .................................. 169/2 R, 169/4
[51] Int. Cl. ............................................. A62c 3/00
[58] Field of Search ............ 169/2 R, 2 A, 4; 239/597

[56] References Cited

UNITED STATES PATENTS

| | | |
|---|---|---|
| 2,545,640 | 3/1951 | Aitken.............................169/4 |
| 2,548,384 | 4/1951 | Marshall.........................169/4 |
| 2,757,744 | 8/1956 | Malone...........................169/4 |
| 2,940,418 | 6/1960 | Penrod et al...........239/597 X |
| 3,341,354 | 9/1967 | Woods et al............239/597 X |
| 3,297,093 | 1/1967 | Eriksson.........................169/4 |
| 3,536,199 | 10/1970 | Cornelius................169/2 A X |
| 3,554,290 | 1/1971 | Verdin........................169/2 R |

Primary Examiner—Allen N. Knowles
Assistant Examiner—Thomas C. Culp, Jr.
Attorney—Jack W. Hayden

[57] ABSTRACT

Float means are formed in sections so that they may be secured together to surround a fire in a water covered area. Nozzle means are mounted on the float means and are communicated with conduit means through which water may be supplied and ejected from the nozzle to provide a water shield for enclosing the flame and cutting off its oxygen supply. Barrier skirt means are secured to the float means to depend downwardly therefrom into the water covered area to trap contaminant floating on the water, and additional conduit means are carried by the float means with an open end projecting on one side of the barrier skirt means for communication with the contaminant floating in the water so that the contaminant may be sucked through such conduit means and discharged into a container to avoid pollution.

5 Claims, 8 Drawing Figures

Patented Aug. 22, 1972

Eberto Gracia
INVENTOR

BY Jack W. Hayden

ATTORNEY

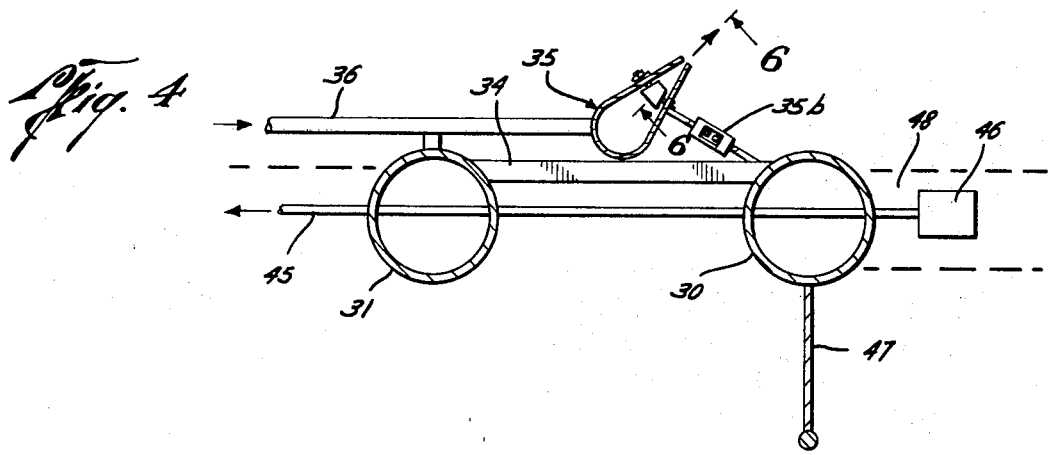
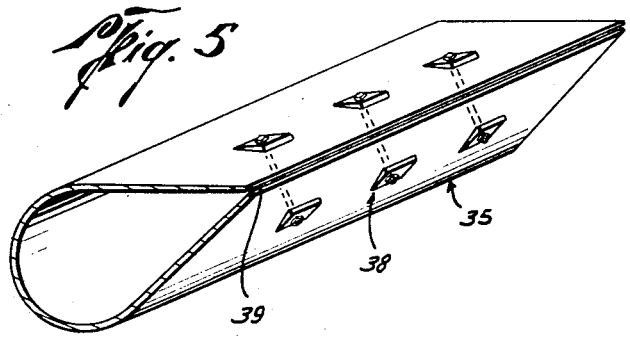
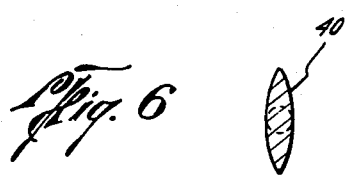
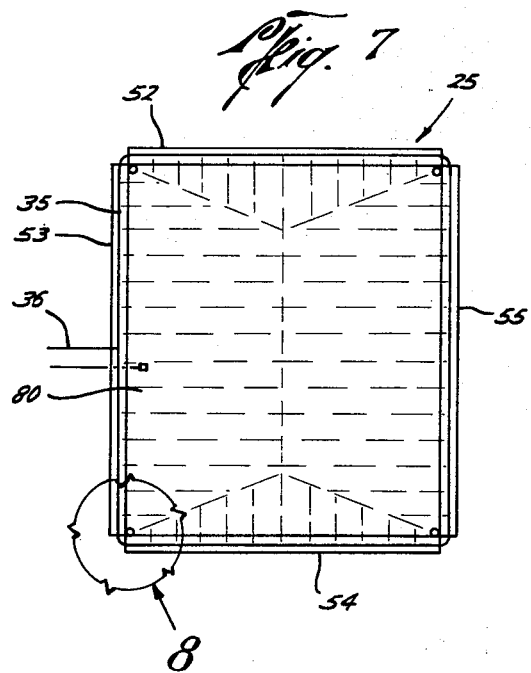
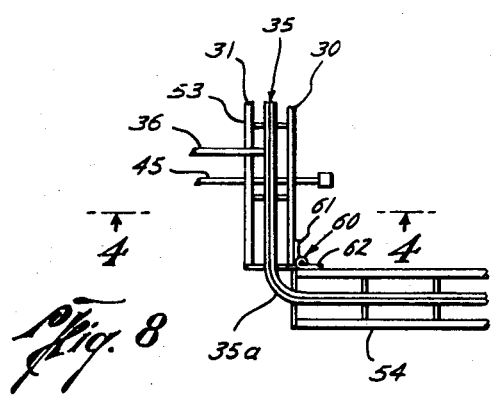
Eberto Gracia
INVENTOR
BY Jack W. Hayden
ATTORNEY

ARRANGEMENT FOR FORMING A WATER SHIELD TO EXTINGUISH FIRES IN WATER COVERED AREAS

BACKGROUND OF THE INVENTION

The present invention relates to an apparatus and an arrangement for aiding in putting out fires in water covered areas such as those fires which occur on platforms or other structures from which oil and gas wells are drilled in the water covered area.

Heretofore, a great deal of difficulty has been encountered in trying to provide a satisfactory arrangement for putting out a fire in the water covered area because of the many problems attendant with such operation. One manner of endeavoring to put out fires of such nature heretofore has been merely by spraying water onto the fire from a plurality of fire boats, or by endeavoring to gain access to the central location of the flame and detonating an explosive in a manner to try to remove the source of oxygen supply from the fire long enough to put it out.

All of such arrangements have not proved entirely satisfactory for one reason or another and do not include satisfactory arrangements for preventing contamination of the water by oil.

SUMMARY OF THE INVENTION

The present invention relates to an arrangement for forming a water shield to extinguish a fire in a water covered area and includes a floating apparatus that can be positioned to enclose the fire, such apparatus being provided with jet nozzle means at spaced intervals therealong with which liquid conduit means are communicated for supplying water to the jet nozzle.

Another object of the present invention is to provide an arrangement for forming a water shield to suffocate a fire and including a skirt barrier means which traps oil and other contaminants floating on the water, there being a suction line carried by the arrangement so that such contaminants may be removed from the area of the fire.

Other objects and advantages of the present invention will become more readily apparent from a consideration of the following description and drawings wherein:

BRIEF DESCRIPTION OF THE DRAWINGS

FIG. 4 is a sectional view on the line 4—4 of FIG. 3 and line 4—4 of FIG. 8;

FIG. 5 is an enlarged view of a form of jet nozzle means which may be employed by the present invention;

FIG. 6 is an enlarged view of a form of bolt adjustment means employed with the jet nozzle means;

FIG. 7 is a schematic illustration of another form of floating arrangement adapted to be positioned to surround a fire in a water covered area; and FIG. 8 is an enlarged view illustrating a portion of the structure of FIG. 7.

DESCRIPTION OF THE PREFERRED EMBODIMENTS

Figure 2:
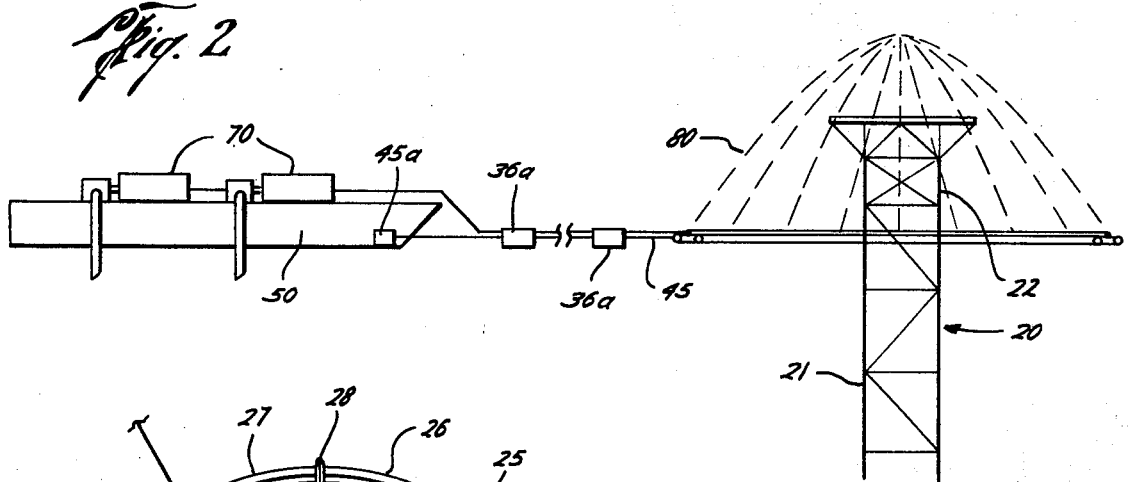
FIG. 2 is a side elevation of the view illustrated in FIG. 1.

Attention is first directed to FIG. 2 of the drawings wherein a platform or structure is represented generally by the numeral 20 in a water covered area. Such structure may be an offshore drilling or producing oil or gas well platform; however, it should be understood that the description of the present invention in connection with its use in this particular type of offshore platform is for purposes of illustration and example only, as the invention may be employed in any situation in a water covered area where it is desired to put out a fire, regardless of the type structure or vessel which is on fire.

The structure 20 includes a portion 21 which depends downwardly beneath the surface of the water and into the earth's surface. The structure projects upwardly above the water surface area as illustrated at 22, and one arrangement of the present invention is referred to generally by the numeral 25 as being positioned to surround the structure as illustrated in plan view in FIG. 1.

Figure 3:
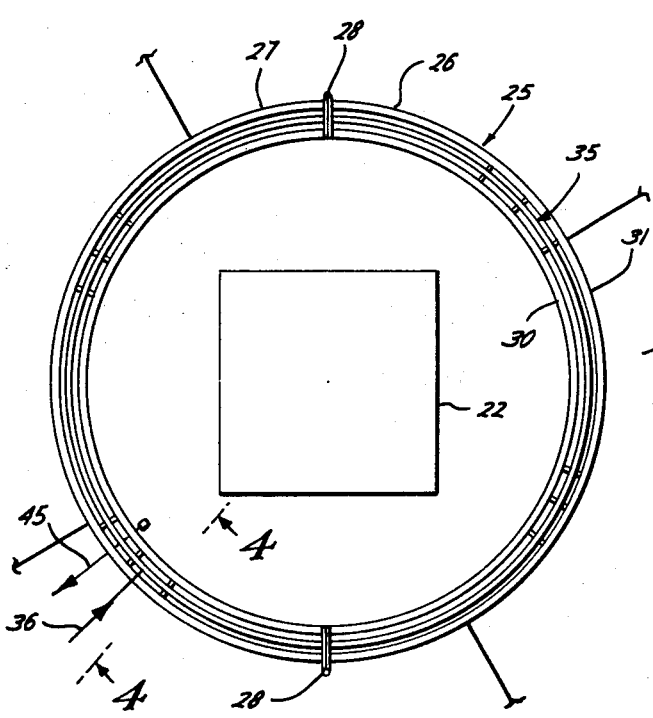
FIG. 3 is an enlarged plan view of one form of a floating arrangement, which is shown as being formed in sections and adapted to be positioned around the fire.

In FIG. 3, the structure 25 is shown in enlarged detail and comprises a plurality of sections, two being represented at 26 and 27 in FIG. 3 of semicircular form which may be floated into position around the structure 20 which is on fire, and the sections 26 and 27 may then be secured together by any suitable means such as flanges with bolts thereon, such means being represented generally at 28 in FIG. 3 of the drawings. When the arcuate sections are joined together, the jet nozzle means 35 is continuous about the structure for which the water shield 80 is to be formed.

Figure 1:
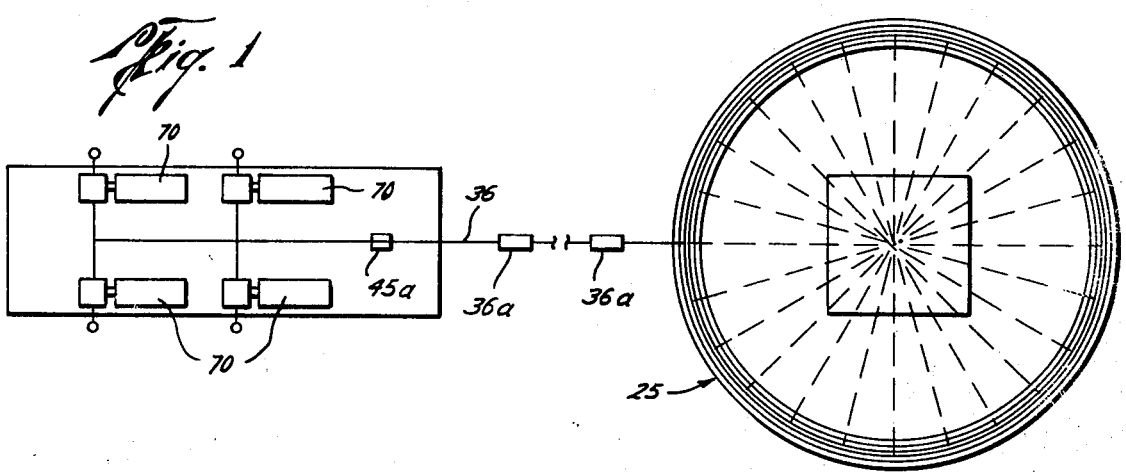
FIG. 1 is a top plan schematic illustration showing a floating arrangement and represented in dotted lines the top plan view of a water shield formed over a burning structure in a water covered area. Water is supplied to the arrangement by means of pumps mounted on a floating vessel.

In FIG. 3, the arrangement 25 is shown as comprising two semicircular sections 26 and 27; however, it can be appreciated that the arrangement can be sectioned in any suitable manner or in any number of arcuate sections to form the circular or polygonal ring to surround or enclose the structure regardless of its shape or configuration as illustrated in FIGS. 1 and 2.

In FIG. 4, the structure 25 is shown in greater detail, and in the form there illustrated, it is shown as including spaced hollow members 30 and 31 which are retained in spaced relation by the structural member 34 secured to each of the hollow members 30 and 31 and extending therebetween. The arrangement 25 provides a support for a nozzle means referred to generally at 35 in FIG. 4. The nozzle means 35 is supported on floats 30 and 31 by the turnbuckles 35b arranged at spaced intervals therealong. At the juncture of the nozzle means 35 and conduit means 36, a movable connection is provided which enables the nozzle means 35 to be adjusted to a desired angle, say, for example, between 15° and 35° relative to the supports 30 and 31. The turnbuckle arrangement 35b supports the nozzle means 35 in its inclined position. The connection between nozzle means 35 and conduit 45 accommodates adjustment of the nozzle means 35 to various inclined positions while maintaining a watertight connection. Thus, the nozzle means 35 can be adjusted to form a shield regardless of the shape and configuration of the structure 22.

Connections 35a are provided between each portion of the quadrilateral to form a continuous jet nozzle means 35. Such nozzle means is communicated by a first conduit means 36 to a source of water supply as will be described in greater detail hereinafter. The nozzle means 35 is illustrated in greater detail in FIG. 5, and such nozzle means is also shown in FIG. 3 as extending continuously of the structural arrangement 25 so that it also surrounds the structure 22 when the arrangement 25 is secured in position around the structure 22. The nozzle 35 is shown in FIG. 5 as including adjustment means referred to generally by the numeral 38 for adjusting the size of the outlet or discharge 39 of the nozzle means 35. The outlet adjustment means 38 comprises a nut and bolt arrangement, the bolt having a configuration as illustrated at 40 in FIG. 6 to prevent less resistance to the water as it is discharged through the outlet 39 in nozzle means.

A second conduit means is illustrated at 45 in FIG. 4 as also being carried by the arrangement 25, such conduit means having an inlet opening illustrated at 46 on one side of the arrangement 25. A barrier skirt means 47 depends from one of the hollow float means 30, as illustrated in FIG. 4 of the drawings, and this skirt means surrounds the structure 22 to retain any oil spillage or other contaminants which float on the surface as a result of leakage from oil or gas wells which may be on fire. The contaminants are represented at 48 in FIG. 4, and it will be noted that the opening 46 in conduit means 45 communicates with the contaminant and suitable suction may be applied through the conduit 45 by suction pump 45a to withdraw the contaminant from the area of the fire for discharge into the vessel means 50 or other suitable container means.

In FIG. 7, the arrangement 25 is shown as comprising a plurality of sections 52, 53, 54, and 55 which may be joined together to form a quadrilateral. Any suitable means may be provided, and as illustrated in FIG. 8, the means of connection illustrated generally at 60 may be in the form of interfitting portions 61 and 62 on adjacent quadrilateral portions which telescopically fit together and through which a pin may be placed to lock them in a predetermined relationship.

This arrangement also includes a first conduit means illustrated at 36 in FIG. 7 for supplying liquid to nozzle means which is diagrammatically shown at 35 as extending continuously of each quadrilateral section.

Suitable means such as the vessel 50 may be provided with pumps illustrated at 70 for pumping water from the area in which the vessel is floating to the conduit 36 which is on floats 36a for discharge through the nozzle means. When this occurs, a curtain or shield 80 of water will be discharged upwardly and over and around the structure 22 which is on fire which will aid in cutting off the supply of oxygen and extinguish the flame. Since the jet nozzle means is continuous, it forms a continuous water shield 80 around and over the fire which the float arrangement surrounds. At the same time, the second conduit means 45 is connected to a vacuum pump represented at 45a to suck the contaminant 48 off the top of the water covered area.

The same function occurs in the FIG. 7 arrangement, except that the shape of the arrangement 25 is different as noted.

The foregoing disclosure and description of the invention are illustrative and explanatory thereof, and various changes in the size, shape, and materials as well as in the details of the illustrated construction may be made without departing from the spirit of the invention.

What is Claimed is:

1. An arrangement for forming a water shield to cut off oxygen and thereby extinguish a fire in a water covered area comprising:
   a. float means for floating in the water covered area, said float means comprising a plurality of sections adapted to be secured together to surround the fire in the water covered area;
   b. first conduit means carried by said float means;
   c. nozzle means communicated to said conduit means and supported by said float means, said nozzle means forming a continuous discharge outlet on said float means surrounding the fire;
   d. said nozzle means including adjustable support means to incline said nozzle means to project upwardly at a desired angle;
   e. barrier skirt means depending from said float means into the water to trap contaminant floating on the water;
   f. second conduit means carried by said float means and having an open end projecting on one side of said barrier skirt means for communication with the contaminant floating on the water;
   g. means for supplying water to said conduit means for discharge through said continuous nozzle means to form a water shield enclosing the fire to extinguish it; and
   h. means for supplying suction to said second conduit means for removing the contaminant floating on the water and surrounded by said barrier skirt means.

2. The invention of claim 1 wherein said float means sections are formed of a plurality of elongated hollow members arranged in generally the same lateral plane and in spaced relation, and means for securing said sections together so that said float means surrounds the fire.

3. The invention of claim 2 wherein said float means sections are arcuate in configuration so that when they are secured together, they form a circle surrounding the fire.

4. The invention of claim 2 wherein said float means sections when secured together form a quadrilateral surrounding the fire.

5. The invention of claim 1 wherein said nozzle means includes adjustment means to vary the size of the discharge opening in the nozzle.

* * * * *